United States Patent

Hsu

[11] 4,097,214
[45] Jun. 27, 1978

[54] PARISON EXTRUSION HEAD
[75] Inventor: John Shao-Tze Hsu, Nashua, N.H.
[73] Assignee: Ingersoll-Rand Company, Woodcliff Lake, N.J.
[21] Appl. No.: 748,685
[22] Filed: Dec. 8, 1976
[51] Int. Cl.² .......................................... B29D 23/04
[52] U.S. Cl. .................................. 425/466; 425/532; 425/381
[58] Field of Search ................. 264/98, 209, DIG. 33, 264/99; 425/381, 466, DIG. 206, 380, 467, 532; 72/264, 265

[56] References Cited
U.S. PATENT DOCUMENTS

| | | | |
|---|---|---|---|
| 3,147,515 | 9/1964 | Amsden | 425/381 |
| 3,205,534 | 9/1965 | Langecker | 425/466 X |
| 3,697,632 | 10/1972 | Tenner | 264/99 X |
| 3,702,227 | 11/1972 | Hureau | 425/466 |
| 3,909,183 | 9/1975 | Hsu | 425/DIG. 206 |

Primary Examiner—Francis S. Husar
Assistant Examiner—Mark Rosenbaum
Attorney, Agent, or Firm—Frank S. Troidl

[57] ABSTRACT

This is an extrusion head for extruding a parison to be blow molded. A shooting mandrel is longitudinally movable within a plastic melt accumulator chamber. After a "shot", the shooting mandrel is in the up position. The plastic melt fed to the plastic accumulating chamber forces the shooting mandrel to the down position as the plastic accumulating chamber is filled. The parison is formed by moving the shooting mandrel upwardly to the up position. The plastic flows around the shooting mandrel as it flows from the accumulating chamber and out of the extrusion head.

4 Claims, 3 Drawing Figures

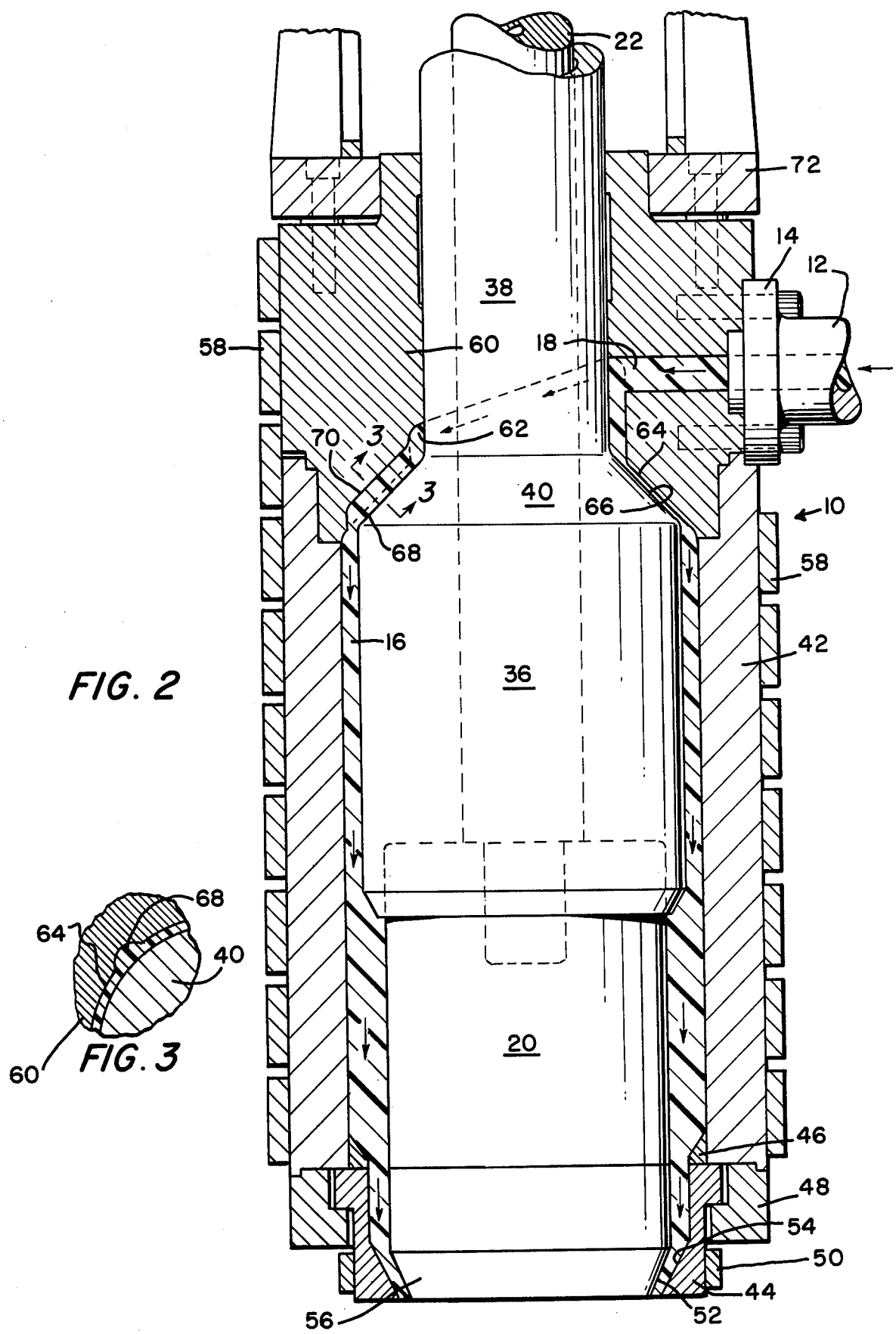

PARISON EXTRUSION HEAD

This invention relates to blow molding machines. More particularly this invention is a new and improved extrusion head for receiving plastic melt from an extruder and preparing the plastic melt for discharge through the blow molding die.

The basic function of a ram-accumulator-type blow mold machine is to form a plastic melt tube or parison from which the product can be blow molded. During the shooting cycle, the plastic melt which was stored in the accumulator must be reformed into a tubular shape by flowing around a mandrel and reknitting. Plastics which are forced to change shape such as by being forced to flow around a mandrel have a tendency to return to their original shape. Thus weak spots tend to develop in the parison being formed unless the plastic properly reknits.

The problem of obtaining a proper reknit is not so great in modern machines when the ram-accumulating type is used in the blow molding of small parts such as squeeze bottles. However, these blow molding machines are inadequate to handle the new tough materials required for larger industrial parts, most of which have a complex design to comply with rigid product specifications. To mold big parts, a larger die head is required to form suitable parisons. The lengths of melt flowpaths through a large head, from infeed to different points at tooling, varies significantly. The tough materials when melted have a high viscosity which magnifies the pressure drop difference even further. This makes dropping a straight controllable parison a very difficult task.

Various types of apparatus have been employed to provide extrusion for industrial blow molding purposes. For example, one such apparatus is shown in U.S. Pat. No.3,909,183 granted Sept. 30, 1975 to John S. Hsu and entitled "Parison Extrusion Head". In the Hsu patent, a movable die body is moved upwardly by the pressure of the thermo-plastic material as the accumulating chamber is filling. After the accumulating chamber is filled, the movable die body is moved downwardly to extrude the molten plastic from the extrusion head around a program mandrel.

The invention to be described herein is of a different structure and operates differently from any other currently known extrusion heads, such as the extrusion head shown in the Hsu U.S. Pat. No. 3,909,183.

Briefly described this invention is an extrusion head comprising a housing with a plastic inlet, a plastic outlet and a plastic accumulating chamber. A longitudinally movable shooting mandrel is located in the chamber. The shooting mandrel has at least two longitudinal portions of different cross section, with the larger cross section being less than the cross section of the accumulating chamber, thereby providing an annulus for the flow of plastic around the larger cross section.

The smaller cross section of the shooting mandrel is above the larger cross section of the shooting mandrel and when the shooting mandrel is in the lowermost position the accumulating chamber is full of plastic with the plastic surrounding the larger cross sectional portion, as well as the upper smaller cross sectional portion. To extrude the molten plastic from the extrusion head, the shooting mandrel is moved upwardly, thereby forcing the plastic in the accumulating chamber to flow around the annulus formed by the larger diameter portion of the shooting mandrel and the inner wall of the accumulating chamber, and out of the plastic outlet to form the parison.

The invention, as well as its many advantages will be further understood by reference to the following detailed description and drawings in which:

FIG. 2 is a fragmentary side vertical view, on an enlarged scale, partly in section, of a part of the extrusion head of FIG. 1 with the shooting mandrel in the uppermost position just before the force of the plastic is high enough to begin moving the shooting mandrel downwardly to the chamber-full position;

FIG. 3 is a view taken along lines 3—3 of FIG. 2 and in the direction of the arrows. In the various Figures, like parts are referred to by like numbers.

Figure 1:
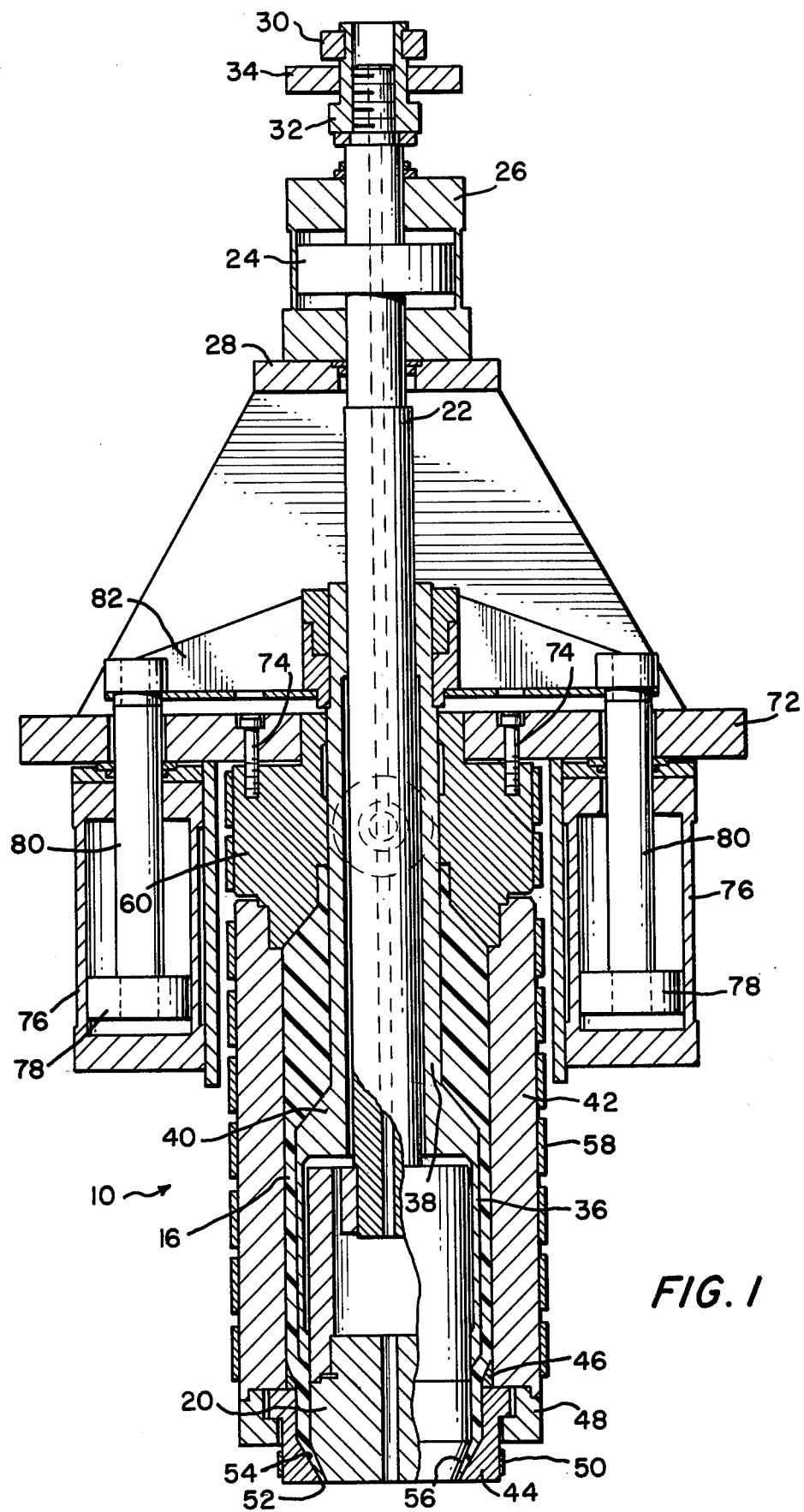
FIG. 1 is a front vertical view, partly in section, illustrating an extrusion head in one form of the present invention wherein the shooting mandrel is in its accumulating chamber full position.

Referring more particularly to FIG. 1 and FIG. 2, the extrusion head includes a housing, indicated generally by the number 10, connected to a conventional extruder 12 (see FIG. 2) by a coupling collar 14. The extruder 12 provides a continuous flow of molten thermo-plastic material to a plastic accumulating chamber 16 in the housing 10 by means of a plastic inlet conduit 18.

The housing has mounted therein a program mandrel 20 connected to the coupling rod 22 extending axially through the housing. The coupling rod 22 is connected at its upper end to the piston 24 mounted for longitudinal movement within a programming cylinder 26 mounted on top plate 28. The programming cylinder 26 is a conventional fluid cylinder which axially moves the program mandrel 20 in a conventional manner for varying the wall thickness of the parison extruded from the extrusion head.

Axially separated collars 30 and 32 straddle stationary plate 34 and serve as stop members to limit the movement of the program mandrel in each direction.

A longitudinally movable shooting mandrel is located in the accumulating chamber. The shooting mandrel has a longitudinal portion 36 of larger diameter or cross section and a longitudinal portion 38 of smaller diameter or cross section. The larger diameter portion 36 is connected to the smaller diameter portion 38 by upwardly tapering annular shoulder 40. Note that the larger diameter portion 36 of the shooting mandrel is located at the bottom of the shooting mandrel so that the larger diameter portion of the shooting mandrel is closer to the plastic outlet of the extrusion die than the rest of the shooting mandrel. Note also the larger diameter portion is of substantially the same diameter throughout its length.

The diameter of the chamber 16 is a predetermined amount greater than the diameter of the larger diameter portion 36 of the shooting mandrel. Also as can be seen from a comparison of FIG. 1 showing the shooting mandrel at its lowermost position within the accumulating chamber 16 and FIG. 2 showing the shooting mandrel in its uppermost position within the accumulating chamber 16, the diameter of the chamber 16 along the length within which the larger diameter portion 36 of the shooting mandrel moves, is substantially constant. Thus, during the shooting cycle, the accumulated melt is pre-shaped to a thinner wall tube inside the extrusion head before entering the die tooling than can be obtained by any currently used extrusion head thus resulting in a straighter parison than can be obtainable by any other extrusion head.

The housing 10 includes a stationary die body 42 which is supported in spaced relation around the shooting mandrel. The stationary die body 42 defines the constant diameter portion of the chamber 16. The stationary portions of the extrusion head also include a plurality of components which are secured together comprising the die ring 44, the sealing ring 46, the clamp ring 48, and the heating band 50 enclosing the die ring. The die ring 44 is in spaced relation around the lower part of the program mandrel 20 so as to define therewith the annular plastic outlet 52. The lowermost inside portion of the die ring 44 is upwardly tapered as at 54 to complement the downwardly tapering shape 56 of the lower portion of program mandrel 20. The stationary die body 42 includes the band heaters 58 for maintaining the molten thermo-plastic material at a proper temperature when flowing through the plastic accumulator chamber 16.

The upper part of the housing 10 comprises a diverter 60 which is connected at its lower end to the upper end of the stationary die body 42. It will be observed that the plastic from the extruder 12 flows through the plastic inlet 18 located in the diverter 60 and against the inclined annular shoulder 62 (see FIG. 2) for uniform distribution between the shooting mandrel and the inside wall of the plastic accumulating chamber 16. The lower inside portion 64 of the diverter 60 is downwardly tapered in order to conform with the upwardly tapered portion 66 of the shoulder 40 when the shooting mandrel is in up position shown in FIG. 2.

As shown in FIG. 2 and FIG. 3 a longitudinal groove 68 extends from a point adjacent the lowest point of inclined annular shoulder 62 along substantially the entire length of tapered portion 64 and is circumferentially spaced from the plastic inlet 18 by an approximately 180° arc. The inner wall 70 of groove 68 is substantially parallel to the tapered wall 64 of the diverter 60.

The longitudinal groove 68 provides a space opposite to the plastic inlet 18 which, in combination with the inclined shoulder 62, increases the flow speed of the plastic at the position diagonally opposite the plastic inlet 18 to prevent sticking of the plastic opposite the plastic entrance. The annulus around the shoulder 40 and the annulus around portion 36 of the shooting mandrel are radially small and uniform throughout their lengths, thereby providing a uniform flow of plastic around the shooting mandrel with the plastic being thin walled, resulting in a more uniform and better formed parison.

The extrusion head also includes the stationary mounting plate 72 which supports the diverter 60 by means of screws 74. Aslo mounted on the stationary mounting plate 72 are a plurality of conventional fluid cylinders 76 which include pistons 78 connected to a cylinder rod 80 for moving the movable yoke 82 when desired to thereby move the shooting mandrel connected to the movable yoke.

In operation, the shooting mandrel is shown in FIG. 1 in the plastic accumulating chamber 16 full position. The rods 80 are actuated by applying fluid to the cylinders 76 thereby moving the movable yoke upwardly thus moving the shooting mandrel upwardly in the accumulating chamber 16. As the shooting mandrel is moved upwardly, the amount of annular opening 52 between the program mandrel 20 and the die ring 44 may be varied according to the program by movement of the program mandrel 20 thus changing and varying the various thicknesses of the parison as it is being discharged from the annular opening 52.

FIG. 2 shows the shooting mandrel at the uppermost position after a shot and after the chamber has begun to be filled and just before the shooting mandrel begins to move downwardly due to the force of the plastic. When the chamber 16 is empty, theshooting mandrel is at its "up" position. Melt pressure builds up as the extruder feeds the plastic into the chamber. The shooting mandrel is forced to collapse over the programming mandrel, thus creating the accumulating chamber for the next shot. During the shooting cycle, the shooting mandrel moves upwardly and the melt is pre-shaped to a nice thin wall tube inside the extrusion head before entering the die ring 44 resulting in a straighter parison due to the more uniform melt quality and pressure.

The structure of this new extrusion head provides a more streamlined approach angle near the bottom of the extrusion head than formerly obtainable, thus allowing a parison to be dropped faster without surface fracture. The smaller diameter portion 38 of the shooting mandrel moves down during the filling cycle, pulling the melt with it. This structure in conjunction with the longitudinal groove 68 helps prevent stagnation at a point 180° opposite the plastic inlet 18. This eliminates a hang-up point where materials can become degraded and allows much faster color changes.

I claim:

1. An extrusion head for extruding a parison comprising: a housing having a plastic inlet and a plastic outlet; a plastic accumulating chamber in the housing for receiving the plastic from the plastic inlet; a longitudinally movable shooting mandrel located in said chamber, said shooting mandrel having at least two longitudinal portions of different cross section, with the larger cross section being less than the cross section of the chamber, the positions of the plastic inlet, plastic outlet, and shooting mandrel being such that when the shooting mandrel is in the chamber full position, the larger cross section is at its closest point to the plastic outlet and furtherest point from the plastic inlet; program mandrel means operatively associated with said outlet for controlling the shape of the parison leaving the plastic outlet; and means operatively associated with said shooting mandrel for moving the shooting mandrel from the chamber full position to the chamber empty position to extrude the plastic from the chamber in the form of a parison.

2. The extrusion head of claim 1 wherein the program mandrel means for controlling the shape of the parison leaving the plastic outlet comprises: a mandrel co-axially mounted within the shooting mandrel, said mandrel being independently movable with respect to the shooting mandrel; and programming means controlling the positions of the mandrel while the plastic is extruded to control the thicknesses of the parison during the formation of the parison.

3. The extrusion head of claim 1 wherein: the plastic accumulating chamber adjacent the plastic inlet is formed by an inclined annular shoulder on the housing; and a longitudinal groove is formed in the housing adjacent the inclined shoulder and circumferentially spaced from the plastic inlet by an approximately 180° arc, whereby the plastic flow at all points around the shooting mandrel is substantially equal.

4. The extrusion head of claim 1 wherein: the accumulating chamber, and shooting mandrel are substantially cylindrical, the larger cross section of the shooting mandrel extends from the end closest to the plastic outlet to a shoulder connecting the larger cross section to the smaller cross section, said larger cross section being substantially constant throughout its length; and the diameter of the accumulating chamber is substantially constant along the longitudinal length within which the larger cross section of the shooting mandrel moves whereby as the shooting mandrel is moving upwardly to the chamber empty position, the thickness of the annular plastic flowing around the larger cross section of the shooting mandrel is substantially the same throughout its length.

* * * * *